United States Patent [19]
Kellner

[11] Patent Number: 6,101,289
[45] Date of Patent: Aug. 8, 2000

[54] METHOD AND APPARATUS FOR UNENCUMBERED CAPTURE OF AN OBJECT

[75] Inventor: Charles R. Kellner, Fremont, Calif.

[73] Assignee: Electric Planet, Inc., Palo Alto, Calif.

[21] Appl. No.: 08/951,087

[22] Filed: Oct. 15, 1997

[51] Int. Cl.[7] .................................................. G06K 9/36
[52] U.S. Cl. .......................................... 382/276; 382/100
[58] Field of Search .................................... 382/284, 294, 382/275, 174, 100, 276; 348/586, 590, 598, 170, 587; 345/115, 121

[56] References Cited

U.S. PATENT DOCUMENTS

| | | | |
|---|---|---|---|
| 4,843,568 | 6/1989 | Krueger et al. | 364/518 |
| 5,014,222 | 5/1991 | Donahue | 345/121 |
| 5,434,617 | 7/1995 | Bianchi | 348/170 |
| 5,657,401 | 8/1997 | De Haan et al. | 382/275 |
| 5,663,809 | 9/1997 | Miyaza et al. | 382/284 |
| 5,675,358 | 10/1997 | Bullock et al. | 345/115 |
| 5,838,310 | 11/1998 | Uya | 348/587 |
| 5,848,181 | 12/1998 | Ogata | 382/275 |
| 5,889,884 | 3/1999 | Hashimoto et al. | 382/174 |

*Primary Examiner*—Yon J. Couso
*Attorney, Agent, or Firm*—Hickman Stephens Coleman, Hughes, LLP

[57] ABSTRACT

A system and method are disclosed for providing an unencumbered capture by a computer system of an object in real-time. An object is placed in a displayer having an appropriate blue-screen surface which is positioned in the view of a camera connected to a computer. The camera captures a frame of an input image which included the object within the displayer being held by a user and possibly other background items. The system identifies a reduced-noise image of the input image and begins isolating the object. Any background items are filled out thereby recognizing the existence of the displayer. The displayer is then filled out leaving the object to be captured and entered into the computer for further manipulation and augmentation. The process is done with minimal human intervention and relies entirely on real-time visual input.

21 Claims, 10 Drawing Sheets

METHOD AND APPARATUS FOR UNENCUMBERED CAPTURE OF AN OBJECT

CROSS REFERENCE TO RELATED APPLICATION

This application claims the benefit of co-pending U.S. patent application Ser. No. 09/174,491, having a priority date of Oct. 15, 1997, and filed on Oct. 15, 1998, and is related to co-pending U.S. patent application Ser. No. No. 08/951,089, filed on Oct. 15, 1997, all of which are incorporated herein by reference.

BACKGROUND OF THE INVENTION

1. Field of Invention

The present invention relates generally to methods and apparatus for augmenting and manipulating objects by entering images of the objects into computer systems. More particularly, the present invention relates to capturing images of an object and entering those images into a computer system in an unencumbered manner.

2. Background

An increasingly important procedure in the field of computer image processing and manipulation is entering images of objects into a computer system so that a digitized version of the image exists for the computer to manipulate. One prevalent method for capturing an image of an object and entering it into a computer system is a procedure generally known as blue-screening.

Blue-screening, from the field of digital effects and chroma-keying, is used in the field of film and video editing by taking an object in one image, e.g. an input image, and compositing that object onto another image, e.g. a destination image, with minimal distortion of the object. For example, this procedure could be used for taking an object such as a human figure in one video and placing that human figure into another video without distorting or altering the image of the person. One video image may have a person standing or moving around in a typical living room and another video can be of an outdoor scene such as a jungle or desert. The compositing procedure would take the image of the human figure in the living room and place the figure in the other video thereby providing the effect of the human figure standing or moving around in the given outdoor setting.

This method is commonly referred to as blue-screening and involves placing a blue or other fixed-color screen behind the object being composited, typically the image of a person (the color blue is a hue that strongly contrasts all colors of human skin). In blue-screening, the system checks to see which pixels in the input image are not blue and labels those pixels as foreground pixels. Normally, the foreground pixels will only be those pixels that are part of the object being composited since there are typically no other objects in the image and the background is solid blue. The system then composites, or blends, the object (i.e. collection of all foreground pixels) onto a destination image. One of the disadvantages of using blue-screening for object compositing is that it requires a fixed color screen behind the object. Another disadvantage is that if any of the colors on the object, such as an item of clothing, is blue, holes will appear in the object in the destination image. This occurs because the pixels in the blue areas on the object will not be labeled as foreground pixels and thus will not be composited with the rest of the object, resulting in the object having holes when composited onto the destination image.

Another prior art method is electronic matting techniques originating from the film industry. In this procedure, an alpha image is a matte image.

The matte technique predates bluescreening, being the film version of the more modem electronic technique. A special film emulsion that is highly sensitive to one particular wavelength of light (in the blue part of the spectrum) is exposed to a scene illuminated by that color. The background of the scene is typically very reflective of this color, and the object(s) being isolated ("bluescreened") are significantly less reflective of this color. A black-and-transparent negative is thus produced that is opaque wherever it was exposed to the blue light. A second "holdout" negative is made directly from this one that is opaque where the first one was transparent, and vice versa. The filmed object is then exposed through the first matte negative in an optical printer, and the filmed background is double-exposed through the second negative, resulting in a composited "bluescreened" image.

Therefore it would be desirable to have a method and apparatus for capturing in real-time an image of an object to enter into a computer in such a way that minimizes formal human intervention with the computer and yet captures, in negligible time, a complete and clean-edged image of the object for the computer to manipulate or augment.

SUMMARY OF THE INVENTION

The present invention provides a computer-implemented system for capturing an image of an object and inputting the image into a computer for digital manipulation, augmentation, and display in real-time. In a preferred embodiment, the object to be captured and displayed is positioned in a box made of a "blue-screen" material. The box is held in front of a camera connected to a computer by a user and removed from the camera's range once the user believes an image of the object has been captured by the camera/computer.

In a preferred embodiment, a method of capturing an image of an object so that it can be digitally processed by a computer is described. A frame of an input image that contains the object in a black box is obtained through a camera. The input image noise level is determined by examining certain properties of pixels from the input image and a reference image. The reference image is created internally by the computer and is composed of pixels whose characteristics are derived from characteristics of pixels from the input image and of pixels from the reference image itself. The input image noise level is then compared to the noise level of an aged reduced-noise image derived from previously obtained input images. The image of the object is then isolated from the black box and inputted into a computer thereby allowing the image of the object to be digitally manipulated. In yet another preferred embodiment, the black box is isolated from the rest of the background before the object within the black box is isolated.

BRIEF DESCRIPTION OF THE DRAWINGS

The invention, together with further advantages thereof, may best be understood by reference of he following description taken in conjunction with the accompanying drawings in which:

FIG. 3a is a diagram showing a box, from the point of view of the camera, with the an object contained within the box being held in front of a camera of FIG. 2a.

FIG. 4b is a continuation of the flow chart of FIG. 4a.

FIG. 5b is a continuation of the flow chart of FIG. 5a.

DETAILED DESCRIPTION OF THE PREFERRED EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

The present invention employs various processes involving data stored in computer systems. These processes are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should remembered, however, that all of these and similar terms are to be associated with the appropriate physical quantities and are merely convenient labels applied to these quantities.

Further, the manipulations performed are often referred to in terms such as identifying, running, comparing, or detecting. In any of the operations described herein that form part of the present invention, these operations are machine operations. Useful machines for performing the operations of the present invention include general purpose digital computers or other similar devices. In all cases, it should be borne in mind the distinction between the method of operations in operating a computer and the method of computation itself. The present invention relates to method blocks for operating a computer in processing electrical or other physical signals to generate other desired physical signals.

The present invention also relates to a computer system for performing these operations. This computer system may be specially constructed for the required purposes, or it may be a general purpose computer selectively activated or reconfigured by a computer program stored in the computer. The processes presented herein are not inherently related to any particular computer or other computing apparatus. In particular, various general purpose computing machines may be used with programs written in accordance with the teachings herein, or it may be more convenient to construct a more specialized computer apparatus to perform the required method blocks.

Figure 1:
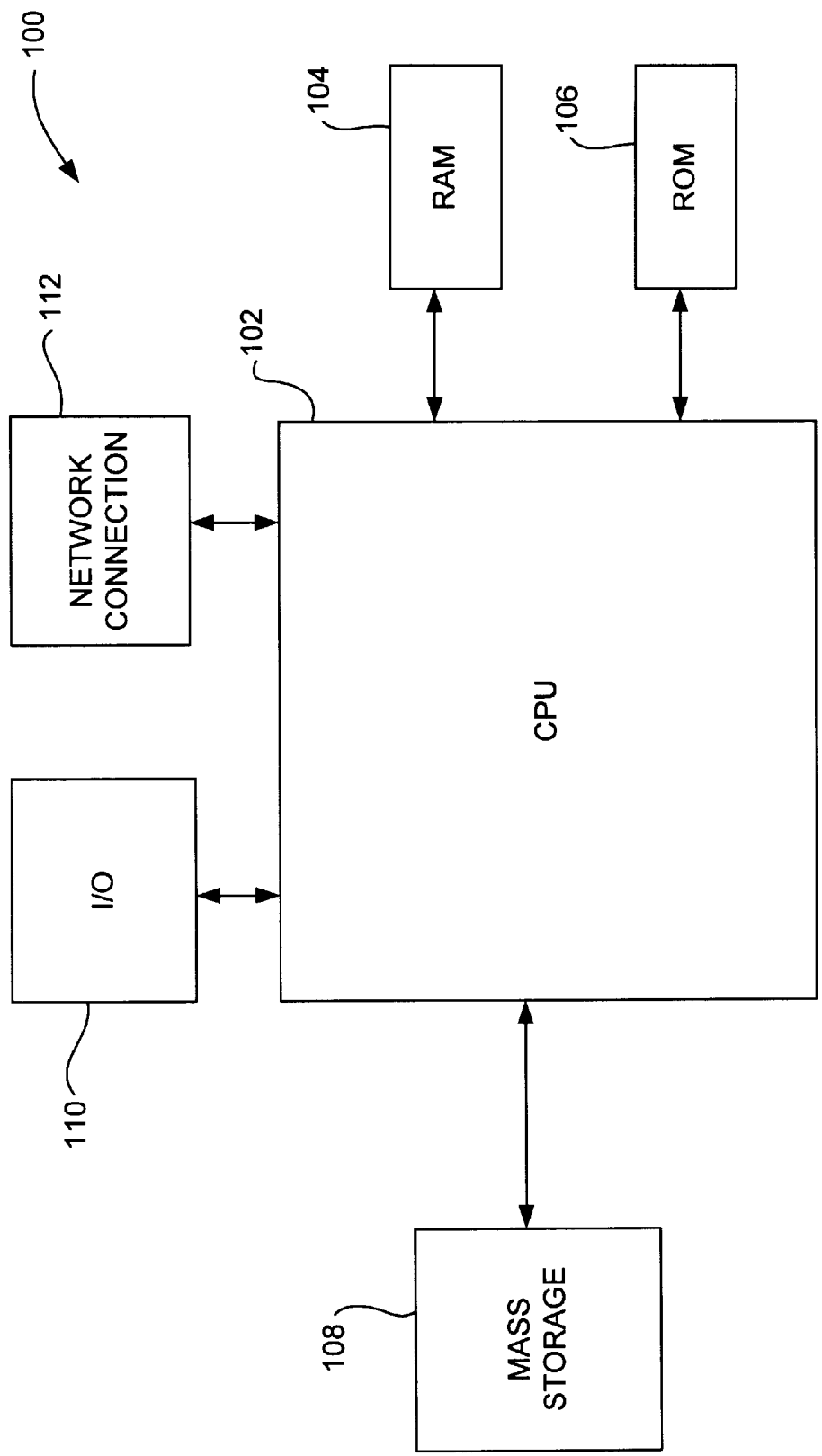
FIG. 1 is a schematic illustration of a general purpose computer system suitable for implementing the process of the present invention.

FIG. 1 is a schematic illustration of a general purpose computer system suitable for implementing the process of the present invention. The computer system includes a central processing unit (CPU) 102, which CPU is coupled bi-directionally with random access memory (RAM) 104 and unidirectionally with read only memory (ROM) 106. Typically RAM 104 includes programming instructions and data, including text objects as described herein in addition to other data and instructions for processes currently operating on CPU 102. ROM 106 typically includes basic operating instructions, data and objects used by the computer to perform its functions. In addition, a mass storage device 108, such as a hard disk, CD ROM, magneto-optical (floptical) drive, tape drive or the like, is coupled bi-directionally with CPU 102. Mass storage device 108 generally includes additional programming instructions, data and text objects that typically are not in active use by the CPU, although the address space may be accessed by the CPU, e.g., for virtual memory or the like. Each of the above described computers further includes an input/output source 110 that typically includes input media such as a keyboard, pointer devices (e.g., a mouse or stylus) and the like. Each computer can also include a network connection 112 over which data, including, e.g., text objects, and instructions can be transferred. Additional mass storage devices (not shown) may also be connected to CPU 102 through network connection 112. It will be appreciated by those skilled in the art that the above described hardware and software elements are of standard design and construction.

Figure 2B:
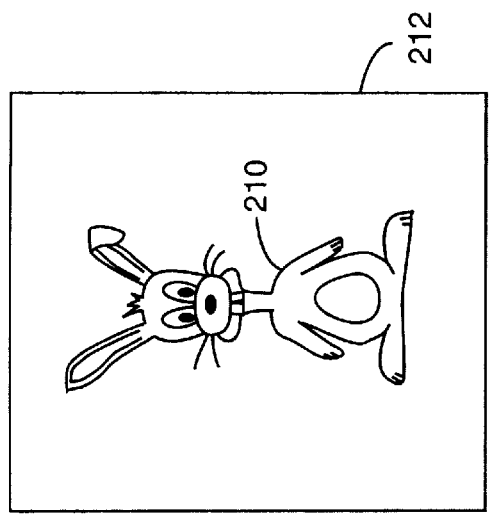
FIG. 2b is an illustration of the captured object composited onto a destination image.
Figure 2A:
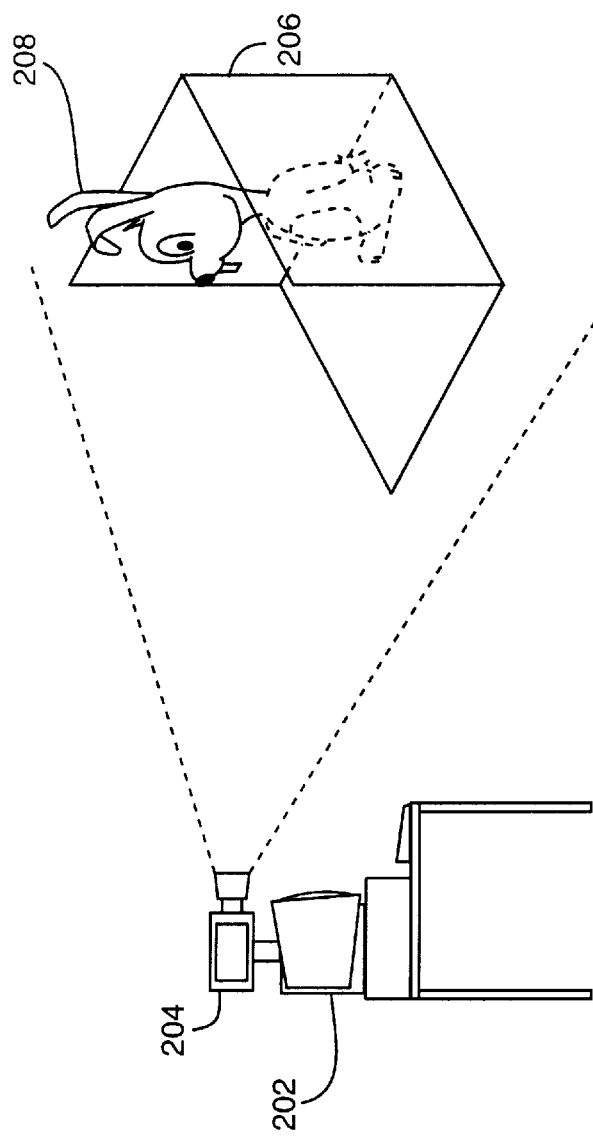
FIG. 2a is an illustration showing components that can be used to implement a preferred embodiment of the present invention.

FIG. 2a is a diagram showing components that can be used to implement a preferred embodiment of the present invention. At 200 is a general purpose computer with a display monitor 202. Connected to computer 200 is a camera 204. The camera can be positioned on top of the computer or wherever it is convenient for a user to access. Camera 204 has a viewing range that should encompass a holder or container, such as a three-sided box 206 being held by a person. The box is described in greater detail in FIG. 3. The person is holding box 206 in front of camera 204 for the purpose of allowing the computer 200 to capture an image of an object 208 contained within box 206. The computer 200 captures an image of the object 208 through the camera 204 capturing several images of the object 208. Once an acceptable image of the object 208 is captured, it is displayed on the computer monitor 202. FIG. 2b is an illustration of the captured object 210 composited onto a destination image 212. The present invention discloses a process and system for an image of the object to be captured and displayed on the monitor as illustrated in FIGS. 2a and 2b. Once captured, the image of the object 208 within the box 206 can be augmented and manipulated by the system, i.e., objects can be added to it or its characteristics can be altered.

Figure 3A:
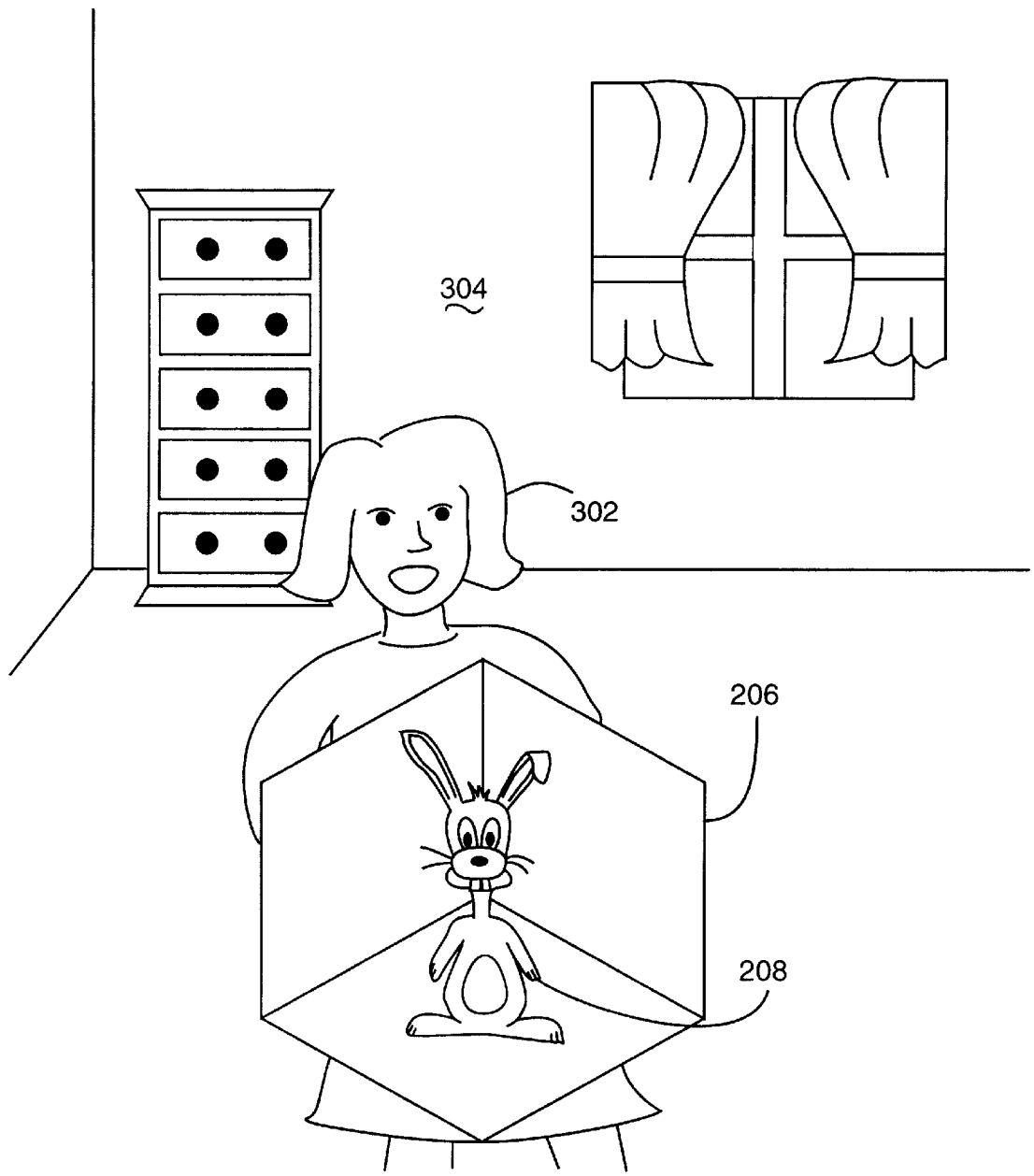
Figure 3B:
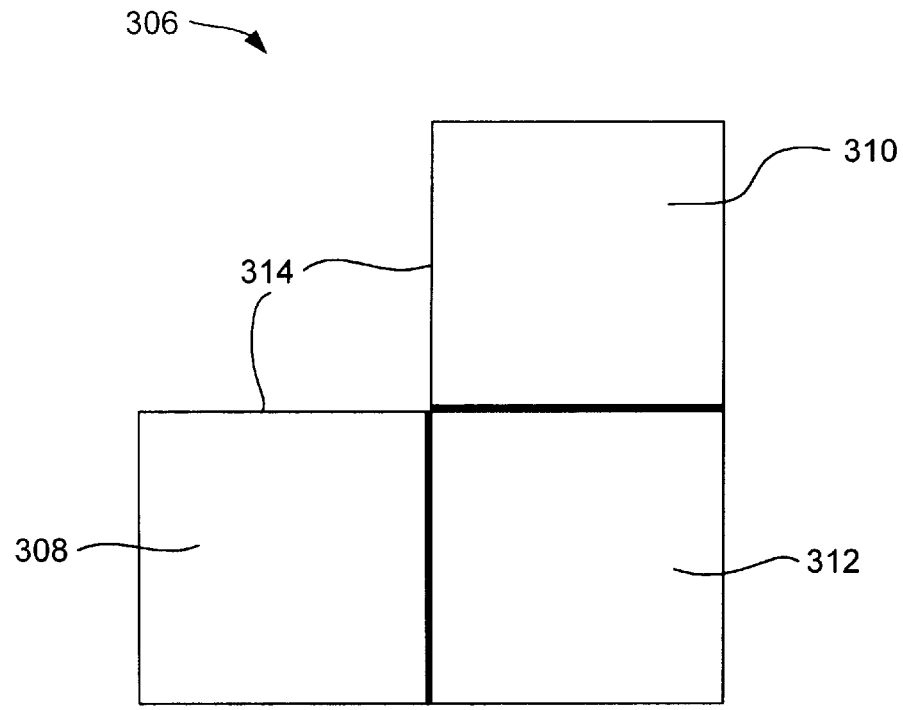
FIG. 3b is an illustration of a preferred embodiment of how to construct a box for use with the present invention.
Figure 3C:
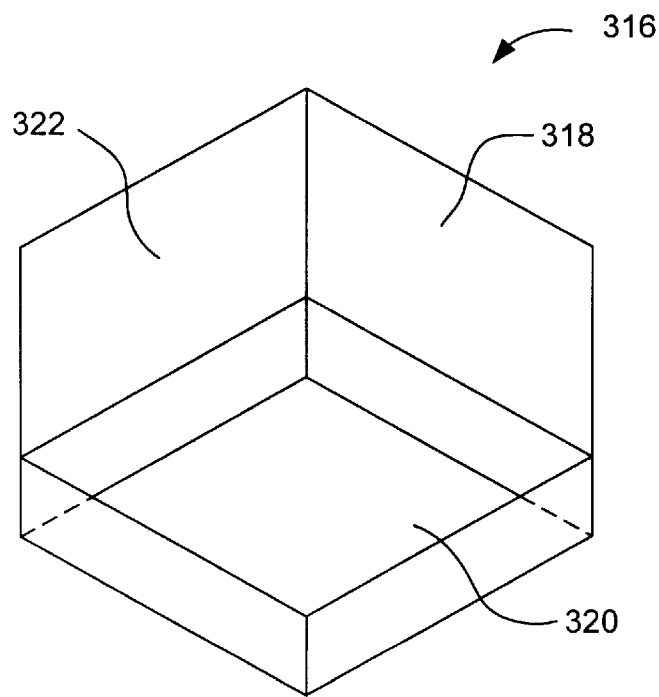
FIG. 3c is an illustration of another preferred embodiment of how to construct a box for use with the present invention.

FIG. 3a is a diagram showing box 206 with the object 208 contained within the box 206 from the point of view of the camera 204 of FIG. 2. FIG. 3a shows a child 302 holding the box 206 directly in front of the camera 204. The child 302 is standing in a room that makes up the background 304. FIG. 3b is an illustration of a preferred embodiment of how to construct box 206. An folded piece of cardboard 306 has three sides: side one 308, side two 310, and bottom 312. Sides 308 and 310 are folded up to so that edges come in contact, thereby creating an enclosed area for an object 208 to be positioned without light from background 304 or colors from the child's clothing to get through. The purpose is to create an enclosed uniform area for the object to be positioned while being held in front of the camera. FIG. 3c is an illustration of another preferred embodiment of container 206 of FIG. 2. A box 316 is shown with a double-layered bottom piece 318 that folds up from bottom 320. Piece 318 folds up to a position such that it is at right angles with bottom piece 320. Piece 318, which is double-layered, then has one of its layers, piece 322 fold out so that piece 322 is at right angles with piece 318 and with bottom piece 320. Once folded out the enclosed box 316 is formed ensuring that light does not seep in through cracks in any of the edges. In this preferred embodiment, a container 206 can be constructed from an existing box, for example, the box in which a product utilizing the present invention is shipped.

Figure 4A:
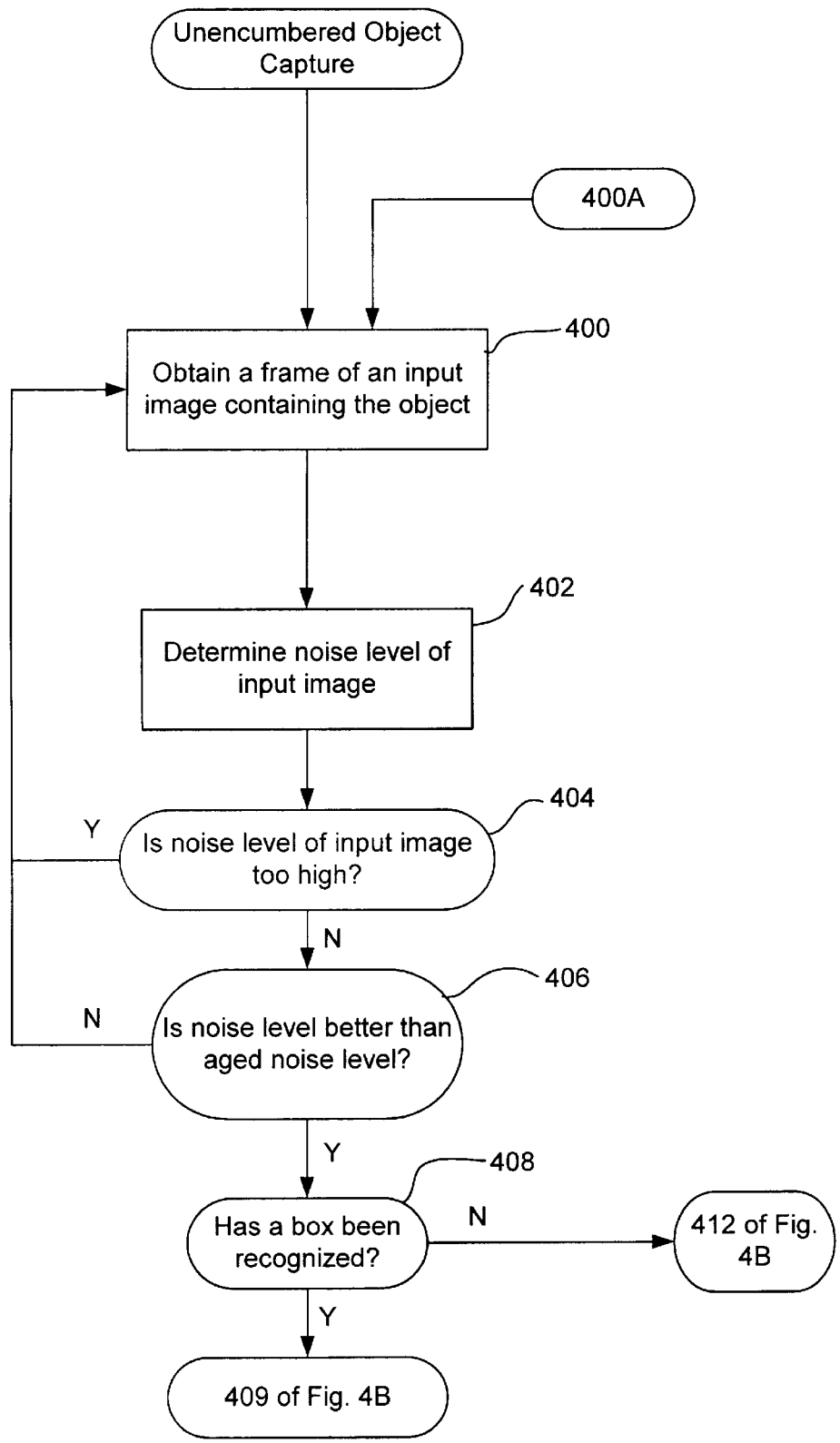
FIG. 4a is a flowchart of a preferred embodiment of a process for an unencumbered capture of an object.
Figure 4B:
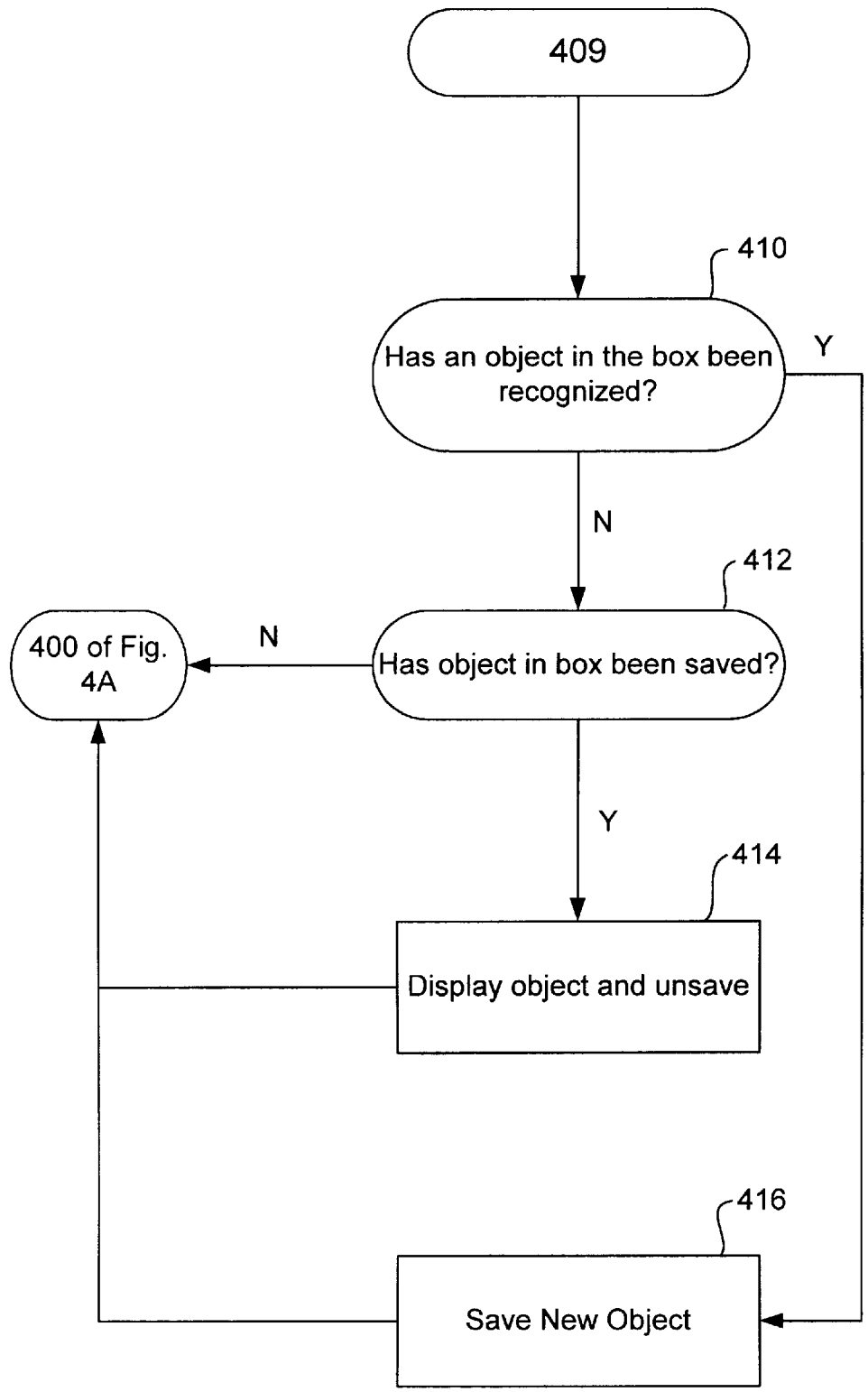

FIG. 4 is a flowchart of a preferred embodiment of a process for an unencumbered capture of an object. The process used by the computer to capture an image of an object so that it can manipulated and augmented by the computer of the present invention is similar to the retinal retention operation used by the human eye. Essentially, the computer sees static images, i.e., the object sitting in the box as described in FIGS. 2 and 3, similar to how eyes see moving images. The object being captured is stabilized so that its image is a reduced noise image. The process is also sensitive to rate-of-change measurements. When the object is going through its lowest rate of change, the camera can capture the best picture. Thus, the box is used to not only provide a uniform background for the object (described below), but also to steadily hold the object being captured.

In a preferred embodiment, the holder or displayer is a box of a certain color or material. In the described embodiment, a black box is used as the container. In a another preferred embodiment, a blue or green colored box can be used. In yet another preferred embodiment, a retro-reflector material can be used if there is an appropriate light source in the camera that can cause the material to switch from a bright to a dark color. It is preferable to have the color of the box not match the color of objects being captured. Thus, the color of the box can vary depending on the context in which the invention is being used.

In block 400 the system obtains a frame containing the object being captured within a three-sided box and possibly some background objects, depending on how close the box or holder is to the camera. The system processes the image one frame at a time. The unencumbered aspect of the object capture requires that a series of frames be processed, shown by control returning to block 400 after the last operation of a complete cycle shown in block 416 of FIG. 4b. In the present invention, the object is entered into the system visually, through a camera, without any other human intervention.

At 402 the system de-noises the input image representing the captured frame. The system stores what it believes is the de-noised image in an off-screen buffer. The de-noising process is a way to recognize a potential frame for capturing the object. In a preferred embodiment, it is designed to interact in a natural way with human beings. When holding the box and object in front of the camera, there is a natural tendency of people to pause or hold the box still for a few seconds in front of the camera. People expect the camera to take a few seconds to get the "right" image. The de-noising process takes into account this natural pause and is designed to work in conjunction with this natural pause. This aspect is described in greater detail below. In another preferred embodiment, even though the object and box have been removed from the camera's view, there may still be noise in the image from, for example, a child moving around in the room. This noise should not prevent the system from processing and displaying the object it has just captured, i.e., the system should not allow the object to remain in capture and not be displayed because of any subsequent irrelevant noise. Thus, the system periodically recognizes that there is no box in the camera's range, but still allows the captured object to be processed by the system.

Figure 5A:
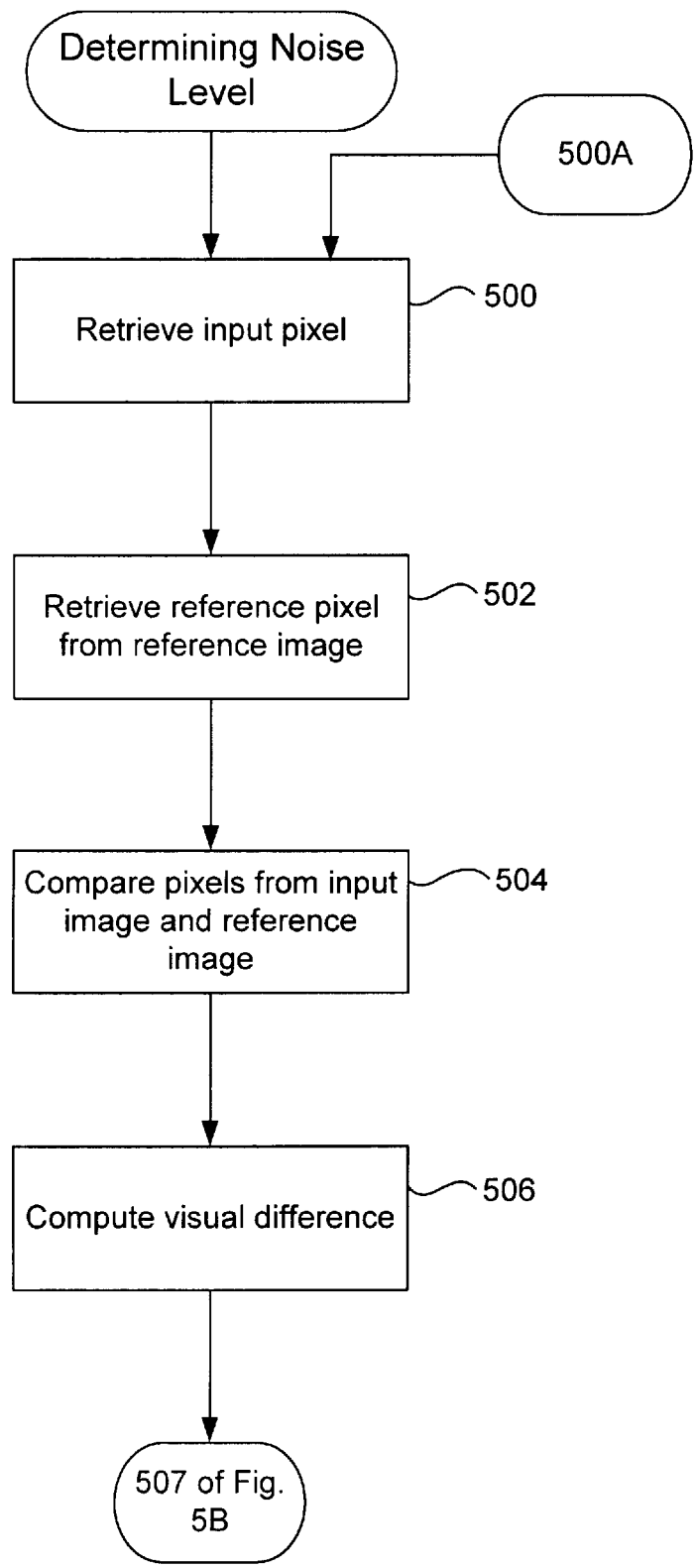
FIG. 5a is a flowchart showing a process for determining a picture noise level of an input image representing a frame.
Figure 5B:
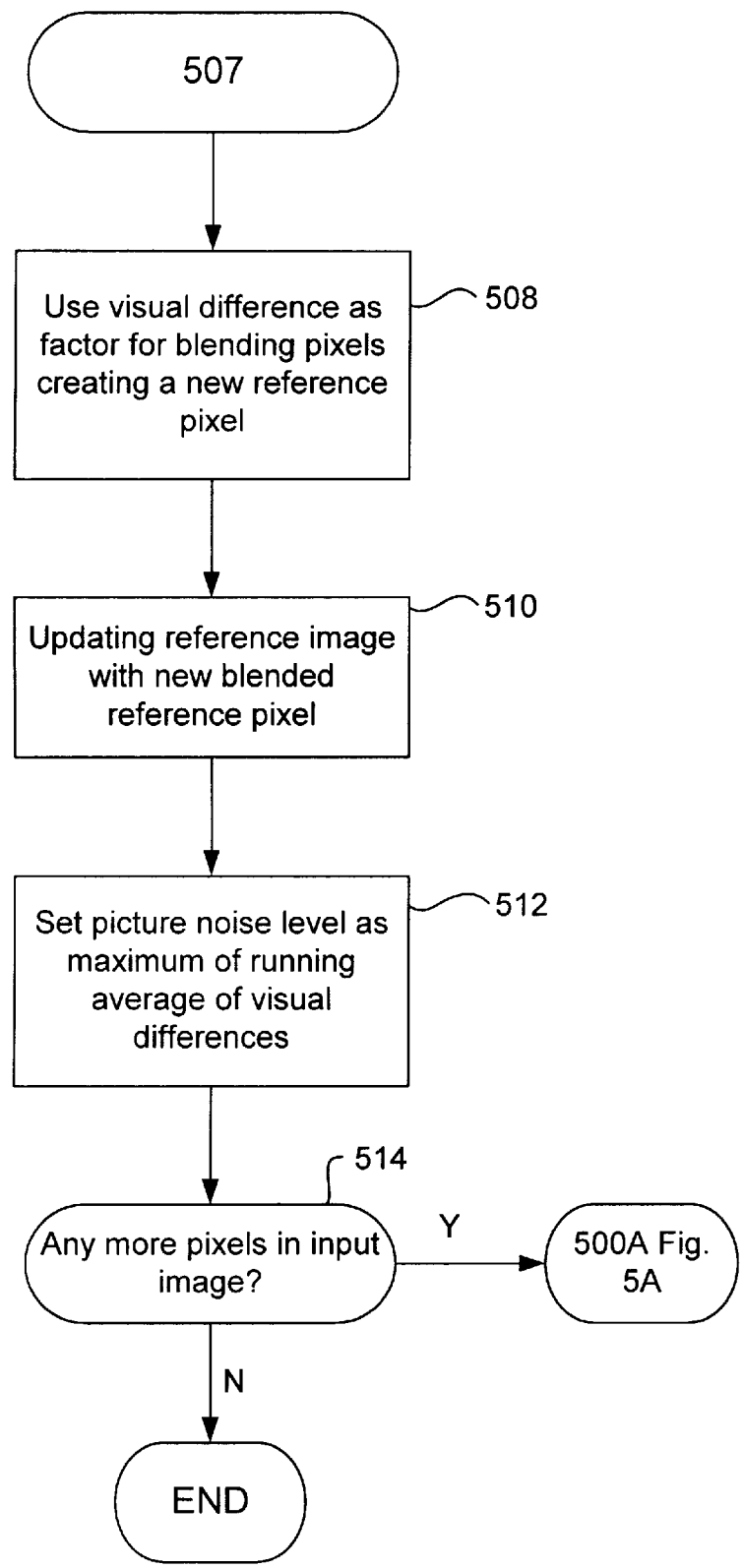

The de-noise process is shown in greater detail in FIG. 5a. FIG. 5a is a flowchart showing a process for determining a picture noise level of an input image representing a frame obtained in block 400 of FIG. 4a. The process begins by taking a pixel from an input image and a pixel from a reference image as shown in blocks 500 and 502, respectively. The reference image is created as the de-noising process runs and is initially set to black, although the starting color of the reference image is irrelevant as it becomes the de-noised image of the camera input within a few seconds. It is created internally from successive camera images, as those captured in block 400 of FIG. 4a. As described below, it is essentially a running average of certain properties of successive camera frames. The system then compares the two pixels in block 504. At 506 the system takes the visual difference of the pixels. In a preferred embodiment, the visual difference is derived from the pixels' differences in luminance and chroma. In FIG. 5b, at 508 a blend rate is derived using a proportion of the visual difference. The system uses this blend rate to blend the input pixel into its corresponding reference pixel. The resulting pixels are then stored back into the reference image in block 510. The system maintains a running average of the visual differences between the pixels. At 512 the maximum value of all the running averages is the value of the picture noise level. At 514 the system check if there are anymore pixels in the input image. If there are, control returns to 500 where the process repeats. Otherwise the de-noise procedure for a single input image is complete.

Returning to FIG. 4a, at 404 the system determines whether the picture noise level as determined in block 402 is too high. The noise level is compared to a predetermined threshold noise level. If the noise level of the picture presently being examined is higher than this threshold level, it is rejected and a new frame of the object is captured at block 400. If the noise level of the picture is acceptable, the system continues with block 406.

At 406 the system compares the noise level derived in block 402 to an aged noise level stored by the system. The system stores noise levels from previous pictures (i.e. input images) and keeps an aged noise level. A picture is saved if its noise value is below a predetermined level as shown in block 404, and also below the aged noise level of the previously saved picture. This noise value is then aged, even though it may not be the lowest of all the values saved previously. If the noise level of a new picture is not better than the aged noise level, the system discards the new frame and control returns to block 400. For each frame that is analyzed subsequently, the noise level of the previously saved picture is incremented. This incrementing step is why the saved noise level is referred to as an "aged" noise value. The system saves and uses the most recent best noise value (i.e. a local minimum value) is used instead of a global minimum because it is preferable to capture the image the user believes is the best image. This is typically the most recent since the user normally takes the object and box away soon after he or she thinks that the best image has been caught by the camera. If the noise level of the new picture is better than the aged noise level, the system then determines whether a box has been recognized in block 408.

If a box or container has been recognized, the system proceeds to block 410 where it determines whether an object within the box has been recognized. Blocks 408 and 410 are described in greater detail below.

A picture is qualified as potentially having a capturable object in the scene by first determining the presence of the box. In the described embodiment, the box is black but may any other "blue-screen" material appropriate for the context. The process for recognizing a box is shown in FIG. 6.

Figure 6:
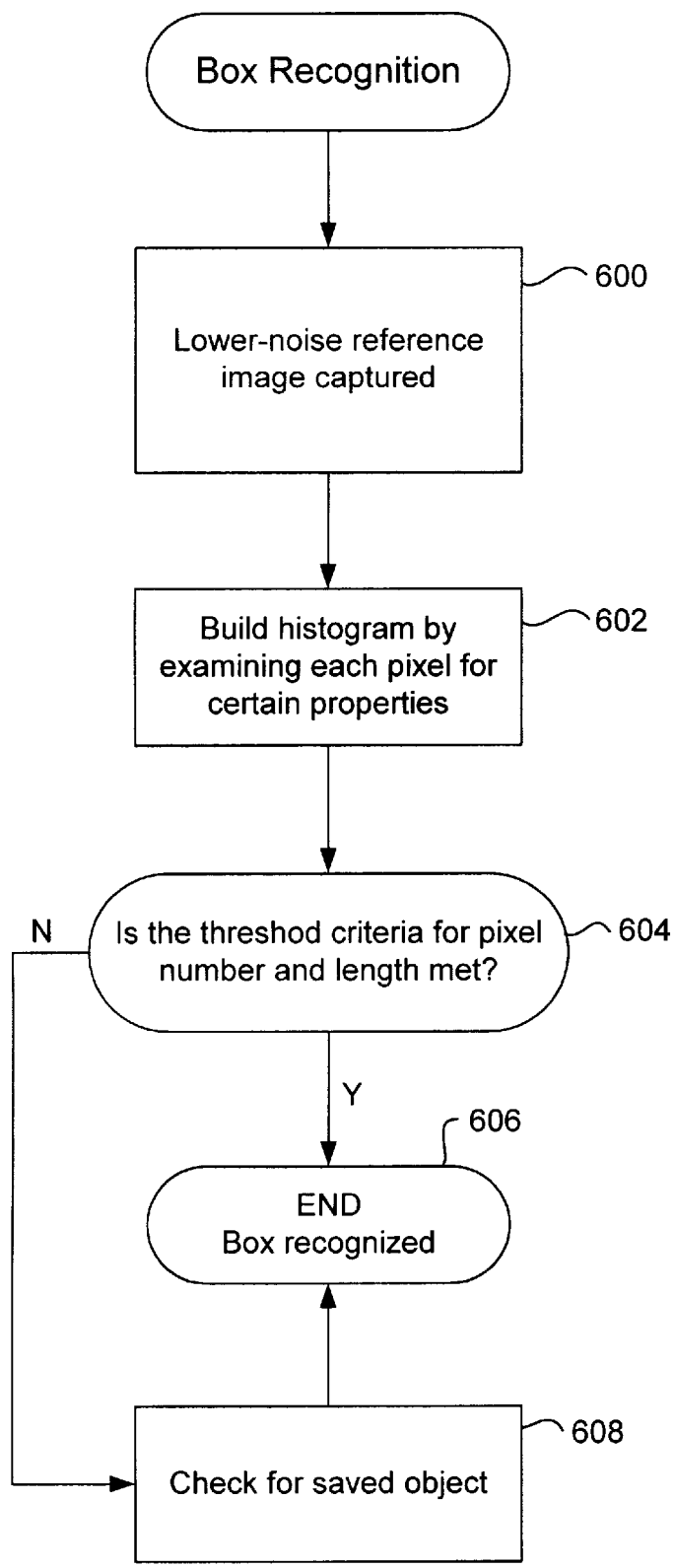
FIG. 6 is a flowchart showing a process for recognizing a box in a preferred embodiment.

FIG. 6 is a flowchart showing a process for recognizing a box in a preferred embodiment. At 600 the system retrieves a low-noise reference image, derived from the sequence of input frames by weighted averaging. In a preferred embodiment, the system creates histograms to determine connected runs of pixels of a predetermined length where each pixel has the same particular quality, such as color, hue, or saturation of chroma. This is shown at block 602. For example, under normal lighting, a black box would have pixels of a dark gray color. Histograms can be created using pixel saturation. Two histograms are created for each frame. A horizontal histogram is created by analyzing vertical rows of pixels, and a vertical histogram is created for a horizontal row of pixels. The histogram is essentially composed of several counts (one count or bucket for each row or column), where each count is the number of pixels in a vertical or horizontal row that qualifies certain criteria, such as having a dark gray color. At 604 the system checks if a threshold for the number of continuous pixels in a row or column is met. For example, a minimum number of pixels in a row may be 20. This predetermined threshold restricts how narrow the box can be for it to be recognizable. If the number of continuous pixels is greater than this threshold, a box has been identified as shown in block 606. If the threshold has not been met, the system checks for a previously saved object as shown in block 608.

Once a box has been identified or recognized, the relevant portion of the picture has been narrowed to a rectangle just large enough to surround the box.

Figure 7:
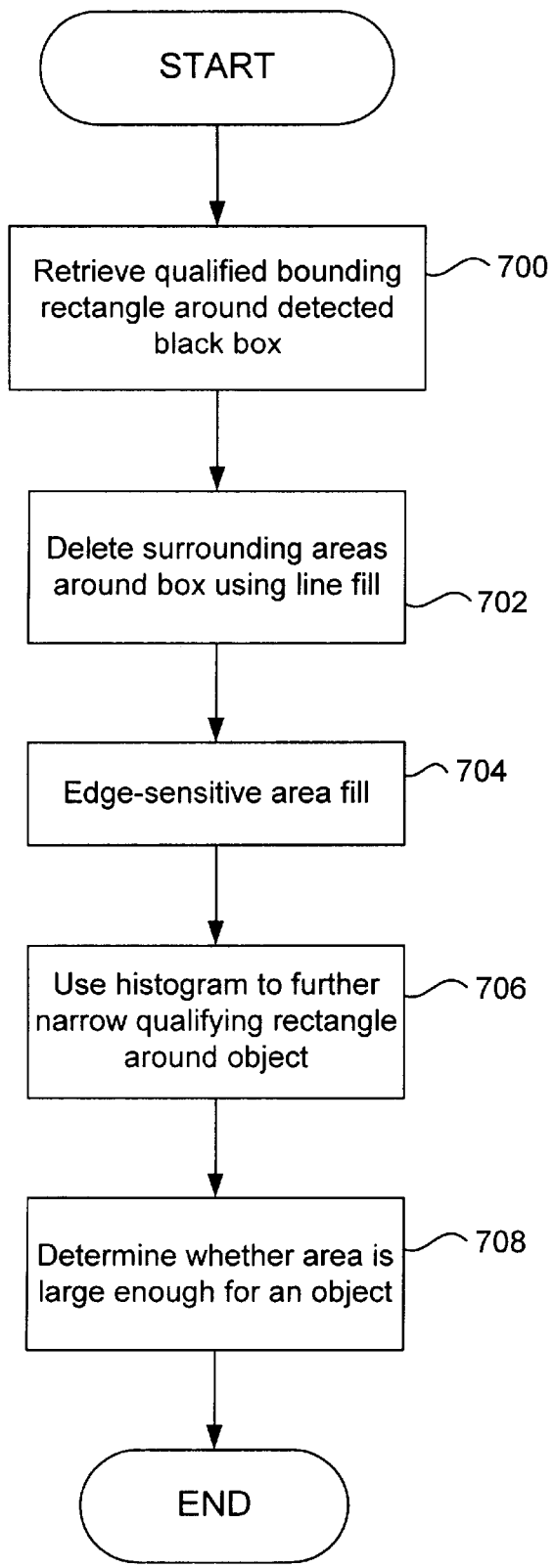
FIG. 7 is a flowchart showing a process for isolating a box within a minimum-sized rectangle.

This is done by cropping the image to the area where the largest continuous run of black pixels was detected, using the histograms obtained in the previous step. FIG. 7 is a flowchart showing a process for isolating a box within the minimum-sized rectangle as determined in FIG. 6. At 700 the system retrieves an image showing the qualified bounding rectangle surrounding the detected black box. At 702 the system performs a standard area fill to remove areas surrounding the box by making them black. The system checks each pixel in turn until it reaches a certain number of continuous black pixels. It will stop filling pixels when it detects, for example, three black pixels in a row. At this stage the system is sufficiently certain that it has reached the edge of the black box.

At 704 the system performs an area fill process inward from the four corners of the black box. This edge-sensitive area fill will isolate the object inside the black box. An edge-sensitive area fill keeps a running average of each pixel's luminance as it examines each pixel. An edge is qualified by a rate of change of luminance and chroma. Typically, the luminance will jump suddenly when the area fill hits a higher edge. The process also examines the chroma of each pixel. Once it hits a pixel with luminance and chroma saturation it stops filling. At this stage the system has an image of the object inside the black box on a black background. In a preferred embodiment, the pixels in the area-filled black surround have alpha values that denote transparency and any areas not filled are opaque.

The system then performs a histogram process similar to the previous histogram process to isolate the largest object in the black box by qualifying or creating a rectangle just large enough to surround the object as shown in block 706. The system uses this information to determine if there is an object in the box. If the qualifying rectangle is sufficiently large, then an object is very likely present. If the rectangle is not larger than a certain size, then there is very likely there is no capturable object in the box. This is so because the object is assumed to have a certain minimum solidity and size, as determined by the number of non-transparent pixels. This determination is made in block 708. Finally, an automatic crop operation is performed to isolate the object. Cropping is a routine well-known in the field of film and video processing. In addition, the process also performs garbage matting, also a feature well-known in the art. It should be noted that the object being captured cannot connect to the edge of the box. At this stage the system has captured an object. All surrounding pixels have been filled with a transparent color. The object has become a transparent-edged object surrounded by a minimum-sized rectangle enclosing the object.

Returning to FIG. 4*b*, in block 410 the system determines whether a box has been recognized. In addition, the system checks whether there is already a saved object since the box may have been removed or the object may have been taken out of the box. If there is a saved object, the system determines that there is no recognized box. If a box has not been recognized, the system returns to block 400 and captures another frame of the object. If a box has been recognized, the system proceeds to block 410, as stated above. If an object has not been recognized, the system determines whether an object in the box has already been saved in the system at shown in block 412. If an object in the box has been recognized, the system saves the new object as shown in block 416. After the system saves the new object, control returns to block 400.

Returning to block 412, if the object has been saved, the system, in a preferred embodiment, displays the object on the monitor for viewing, and then unsaves or deletes it. Once it is captured and entered into the system, it can be manipulated and augmented, and does not need to be stored any longer for the object image capturing process. Once the object is displayed and unsaved, control returns once again to block 400 where the system repeats the process by capturing another frame of the object.

Although the foregoing invention has been described in some detail for purposes of clarity of understanding, it will be apparent that certain changes and modifications may be practiced within the scope of the appended claims.

Furthermore, it should be noted that there are alternative ways of implementing both the process and apparatus of the present invention. For example, alternative ways to capture a de-noised image is by voice input, a high-speed camera, or a key stroke. By using these processes, it would not be necessary to determine which image is capturable. In another example, edge-finding filters that are more processor intensive may also be used to detect edges. In another example, different types of blue-screen material may be used, such as green, an unusual pattern not likely to be found in the objects being captured, or a retro-reflective material. Accordingly, the present embodiments are to be considered as illustrative and not restrictive, and the invention is not to be limited to the details given herein, but may be modified within the scope and equivalents of the appended claims.

What is claimed is:

1. A computer-implemented method of capturing an image of an object comprising:

obtaining a frame of an input image that contains an object to be captured;

determining an input image noise level wherein the input image noise level is ascertained by examining properties of the input image and a reference image;

determining whether the input image noise level is preferable to a noise level of an aged reduced-noise image derived from a previously obtained input image;

isolating an object image of the object in the input image such that areas surrounding the object are determined to be separate from the object; and inputting the object image into a computer thereby allowing the object image to be digitally manipulated.

2. A method as recited in claim 1 wherein obtaining a frame of an input image further includes stabilizing the object in a displayer made of an appropriate blue-screen material.

3. A method as recited in claim 1 wherein obtaining a frame of an input image further includes displaying the object in front of a camera.

4. A method as recited in claim 1 wherein determining the input image noise level further includes creating the reference image from pixels whose properties are derived from properties of pixels in the input image.

5. A method as recited in claim 1 wherein determining the input image noise level further includes maintaining a running average of visual differences between the input image and the reference image.

6. A method as recited in claim 1 wherein the aged reduced-noise image has a noise level that is adjusted when a new input image is obtained.

7. A method as recited in claim 1 wherein determining whether the input image noise level is preferable to a noise level of an aged reduced-noise image further includes comparing the input image noise level to a threshold noise level.

8. A method as recited in claim 1 wherein isolating an object image further includes determining whether a displayer surrounds the object being captured.

9. A method as recited in claim 1 wherein isolating an input image further includes creating one or more histograms for an image derived from the input image.

10. A method as recited in claim 1 wherein isolating an image of the object further includes isolating a displayer in the input image.

11. A computer readable medium including program instructions implementing the process of claim 1.

12. A computer-implemented system for capturing an image of an object, the system comprising:

a frame capturer for obtaining a frame of an input image that contains an object to be captured;

a noise-level detector for determining the noise level of an input image wherein the noise level is ascertained by examining properties of the input image and a reference image;

a noise-level comparator for determining whether the input image noise level is preferable to a noise level aged reduced-noise image derived from a previously obtained input image;

an image isolator for isolating an object image of the object and input image such that areas surrounding the object are determined to be separate from the object; and an image transmitter for inputting the image into a computer thereby allowing the object image to be digitally manipulated.

13. A system as recited in claim 12 wherein the frame capture further comprises an object displayer made of an appropriate blue-screen material for stabilizing the object.

14. A system as recited in claim 12 wherein the object is displayed in front of a camera.

15. A system as recited in claim 12 wherein the noise level detector further includes an image creator for creating the reference image from pixels whose properties are derived from properties of pixels in the input image.

16. A system as recited in claim 12 wherein the noise-level detector further comprises a visual comparator for maintaining a running average of visual differences between the input image and the reference image.

17. A system as recited in claim 12 wherein the noise-level comparator further comprises a noise-level adjuster for adjusting a noise level for the aged reduced-noise image when a new input image is obtained.

18. A system as recited in claim 12 wherein the noise-level comparator compares the input image noise-level to a threshold noise level.

19. A system as recited in claim 12 wherein the image isolator further comprises a display dector for determining whether a displayer surrounds the object being captured.

20. A system as recited in claim 12 wherein the image isolator further comprises a histogram creator for creating one or more histograms for an image derived from the input image.

21. A system as recited in claim 12 wherein the image isolator isolates a displayer in the input image.

* * * * *

UNITED STATES PATENT AND TRADEMARK OFFICE
CERTIFICATE OF CORRECTION

PATENT NO. : 6,101,289
DATED : August 8, 2000
INVENTOR(S) : Charles R. Kellner

It is certified that error appears in the above-identified patent and that said Letters Patent is hereby corrected as shown below:

<u>Column 2,</u>
Line 5, reads "film version of the more modem electronic technique. A", it should read
-- film version of the more modern electronic technique. A --

Signed and Sealed this

Twenty-first Day of May, 2002

Attest:

JAMES E. ROGAN
*Attesting Officer*     *Director of the United States Patent and Trademark Office*